April 18, 1967 E. V. BUNTING ETAL 3,314,484

TRACTOR HYDRAULIC SYSTEM

Filed April 17, 1964 8 Sheets-Sheet 1

INVENTORS.
ERNEST V. BUNTING
HANS V. LIND
EDWIN J. SKIBA
GLENNARD T. OLSON

BY

Wolfe, Hubbard, Voit & Osann
ATTORNEYS.

April 18, 1967 E. V. BUNTING ETAL 3,314,484

TRACTOR HYDRAULIC SYSTEM

Filed April 17, 1964 8 Sheets-Sheet 2

INVENTORS.
ERNEST V. BUNTING
HANS V. LIND
EDWIN J. SKIBA
GLENNARD T. OLSON

BY Wolfe, Hubbard, Voit & Osann
ATTORNEYS.

TRACTOR HYDRAULIC SYSTEM

Filed April 17, 1964 8 Sheets-Sheet 3

INVENTORS.
ERNEST V. BUNTING
HANS V. LIND
EDWIN J. SKIBA
GLENNARD T. OLSON
BY
Wolfe, Hubbard, Voit & Osann
ATTORNEYS.

April 18, 1967 E. V. BUNTING ETAL 3,314,484

TRACTOR HYDRAULIC SYSTEM

Filed April 17, 1964 8 Sheets-Sheet 4

INVENTORS.
ERNEST V. BUNTING
HANS V. LIND
EDWIN J. SKIBA
GLENNARD T. OLSON

BY Wolfe, Hubbard, Voit & Osann
ATTORNEYS.

INVENTORS.
ERNEST V. BUNTING
HANS V. LIND
EDWIN J. SKIBA
GLENNARD T. OLSON
BY
Wolfe, Hubbard, Voit & Osann,
ATTORNEYS.

INVENTORS.
ERNEST V. BUNTING
HANS V. LIND
BY EDWIN J. SKIBA
GLENNARD T. OLSON
Wolfe, Hubbard, Voit & Osann
ATTORNEYS.

INVENTORS.
ERNEST V. BUNTING
HANS V. LIND
BY EDWIN J. SKIBA
GLENNARD T. OLSON
Wolfe, Hubbard, Voit & Osann
ATTORNEYS.

INVENTORS.
ERNEST V. BUNTING
HANS V. LIND
EDWIN J. SKIBA
GLENNARD T. OLSON
BY
Wolfe, Hubbard, Voit & Osann
ATTORNEYS.

United States Patent Office 3,314,484

Patented Apr. 18, 1967

3,314,484

TRACTOR HYDRAULIC SYSTEM

Ernest V. Bunting, Detroit, Hans V. Lind, Royal Oak, Edwin J. Skiba, Warren, and Glennard T. Olson, Detroit, Mich., assignors to Massey-Ferguson Inc., Detroit, Mich., a corporation of Maryland Filed Apr. 17, 1964, Ser. No. 360,663
10 Claims. (Cl. 172—9)

This invention relates to control systems for agricultural tractors and more particularly concerns a multi-function hydraulic system for controlling the operation of tractors embodying the "Ferguson system" type of hitch linkage.

The basic Ferguson system comprises a tractor with trailingly pivoted draft links that can be hydraulically lifted. The hydraulic lifting action is regulated from a settable valve by draft force feedback so as to maintain a desired draft loading.

Draft link position control has also become a common adjunct to the basic Ferguson system. This enables the tractor operator to elevate the hitch linkage to positions corresponding to the settable range of a hand control lever. More recently, it has become desirable to obtain the advantages of draft control operation with large semi-mounted and pull-type or drawbar mounted implements, and for this purpose, it has been proposed to add the function of hydraulic pressure control to draft and position control. Pressure control enables an operator to select and maintain a desired hydraulic actuator force so that predetermined amounts of weight can be transferred from semi-mounted and pull-type implements to the tractor.

While multi-function control systems are versatile and give a tractor owner great flexibility in the use of his equipment, they do pose problems of convenience, understandability, and reliability from the operation standpoint.

Accordingly, it is the primary aim of the present invention to provide a tractor hydraulic control system having a single manual lever affording draft, position and pressure control of the system so that tractor operation is convenient, readily understandable to the operator and not subject to inadvertent actuation caused by fumbling or confusion between controls.

It is also an object of the invention to provide a control system of the above kind that operates smoothly and easily with a good responsive "feeling" to the operator. A collateral object is to provide a system of this type having uniform control response even when handling heavy loadings and large quantities of oil as are found in the larger, heavy duty tractors.

Another object is to provide a central or common hydraulic system for a tractor utilizing an improved control system of the type characterized above.

A further object is to provide a control system as described above which avoids sudden, jerking movements of the linkage and which includes a simplified arrangement permitting selection of suitable response rates for both dropping and elevating the linkage.

Yet another important object is to provide a system of the above character which is reliable, easily assembled and adjusted, and well suited for commercial production.

Other objects and advantages of the invention will become apparent upon reading the following detailed description and upon reference to the drawings, in which.

Figures 1, 2, 3:
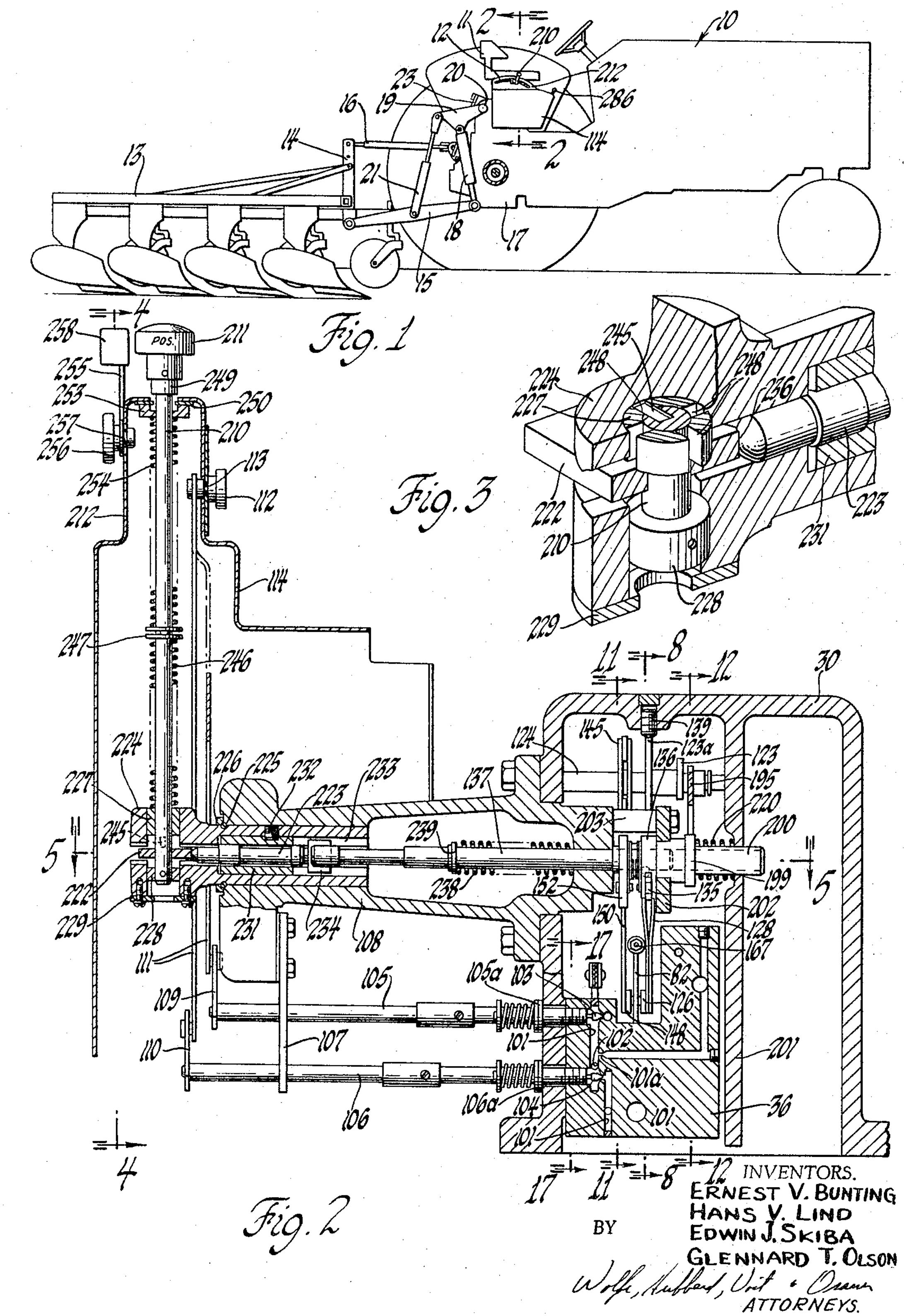
FIGURE 1 is a side elevation of a tractor-implement combination embodying the control system of the present invention, with the tractor having its near side drive wheel sectioned out.
FIG. 2 is an enlarged fragmentary section taken approximately along the line 2—2 in FIG. 1.
FIG. 3 is a fragmentary sectioned perspective, slightly enlarged, showing a portion of the structure appearing in FIG. 2.
Figures 8, 9, 10:
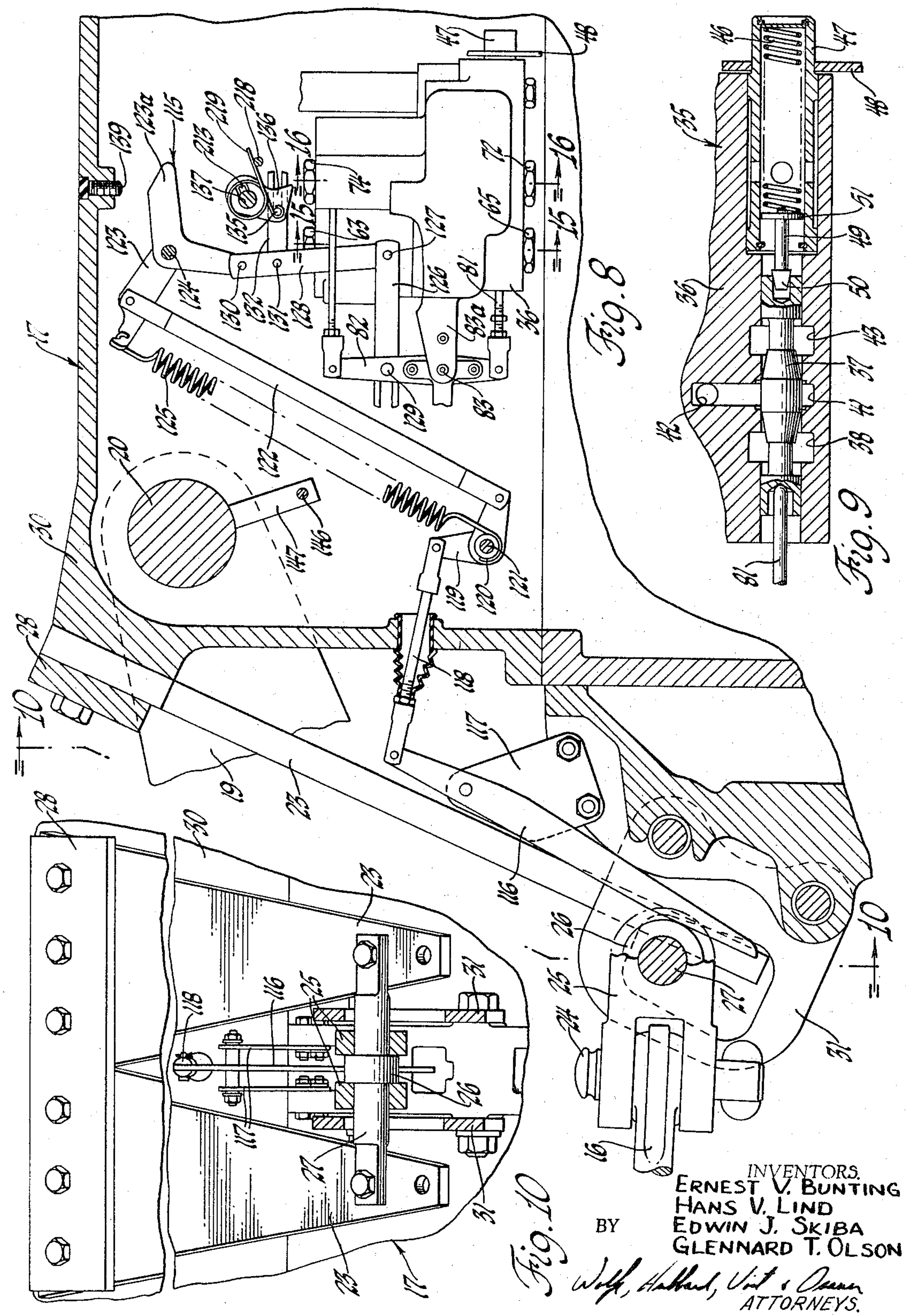
FIG. 8 is an enlarged section taken approximately along the line 8—8 in FIG. 2.
FIG. 9 is an enlarged fragmentary section of the lower right hand portion of the structure appearing in FIG. 8.
FIG. 10 is a fragmentary rear elevation, with portions in section, as taken approximately along the line 10—10 in FIG. 8.
Figure 15:
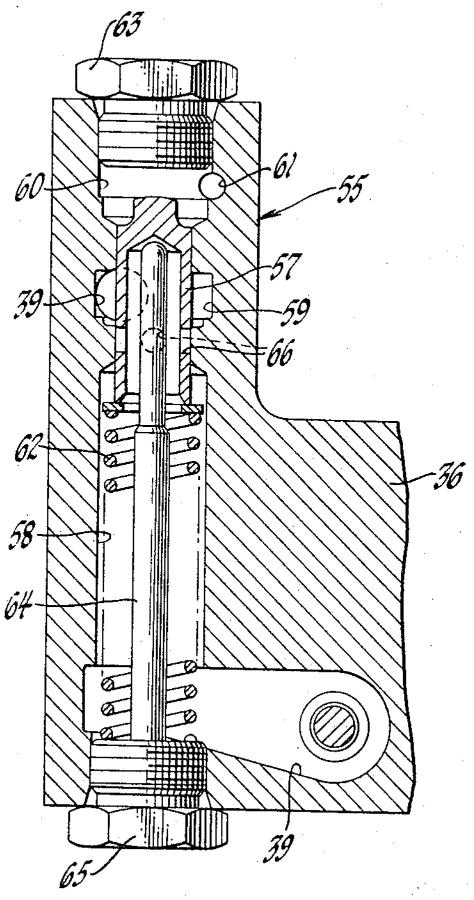
Figure 16:
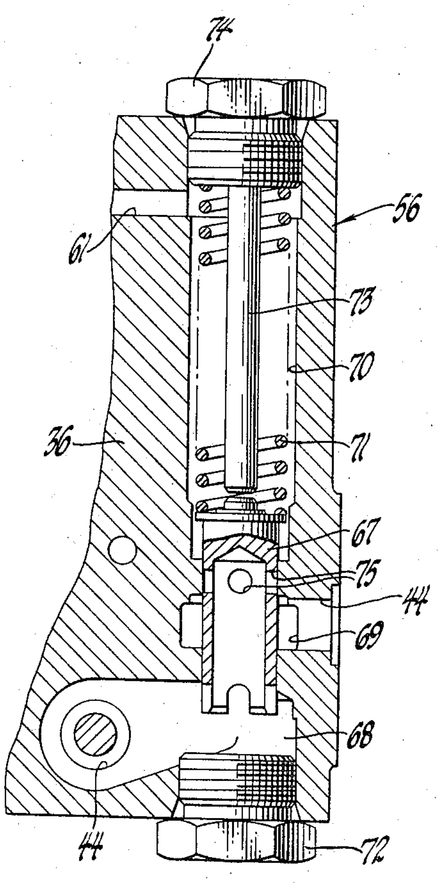
Figure 17:
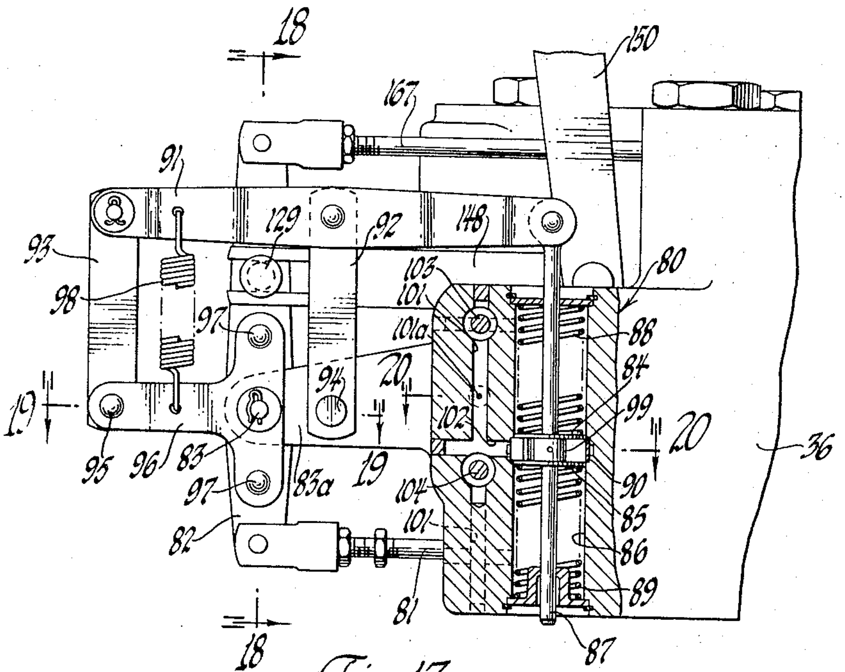
Figure 20:
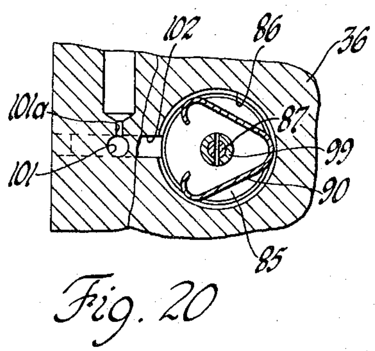
Figure 18:
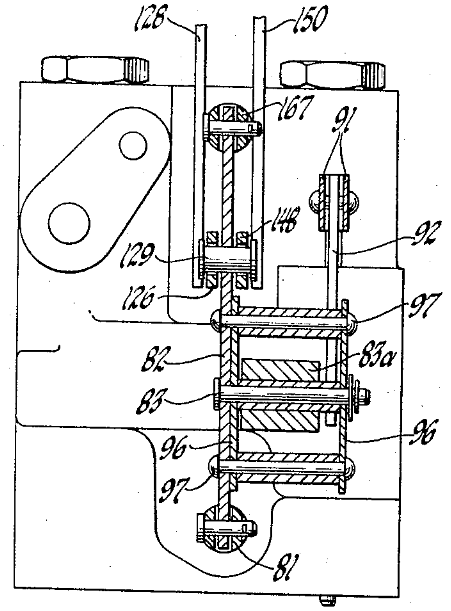
Figure 19:
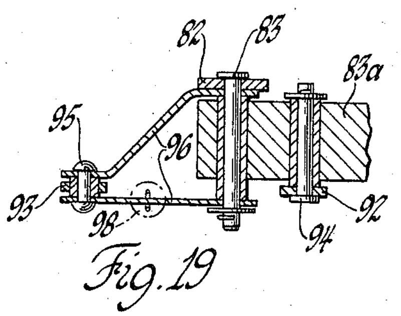
Figure 21:
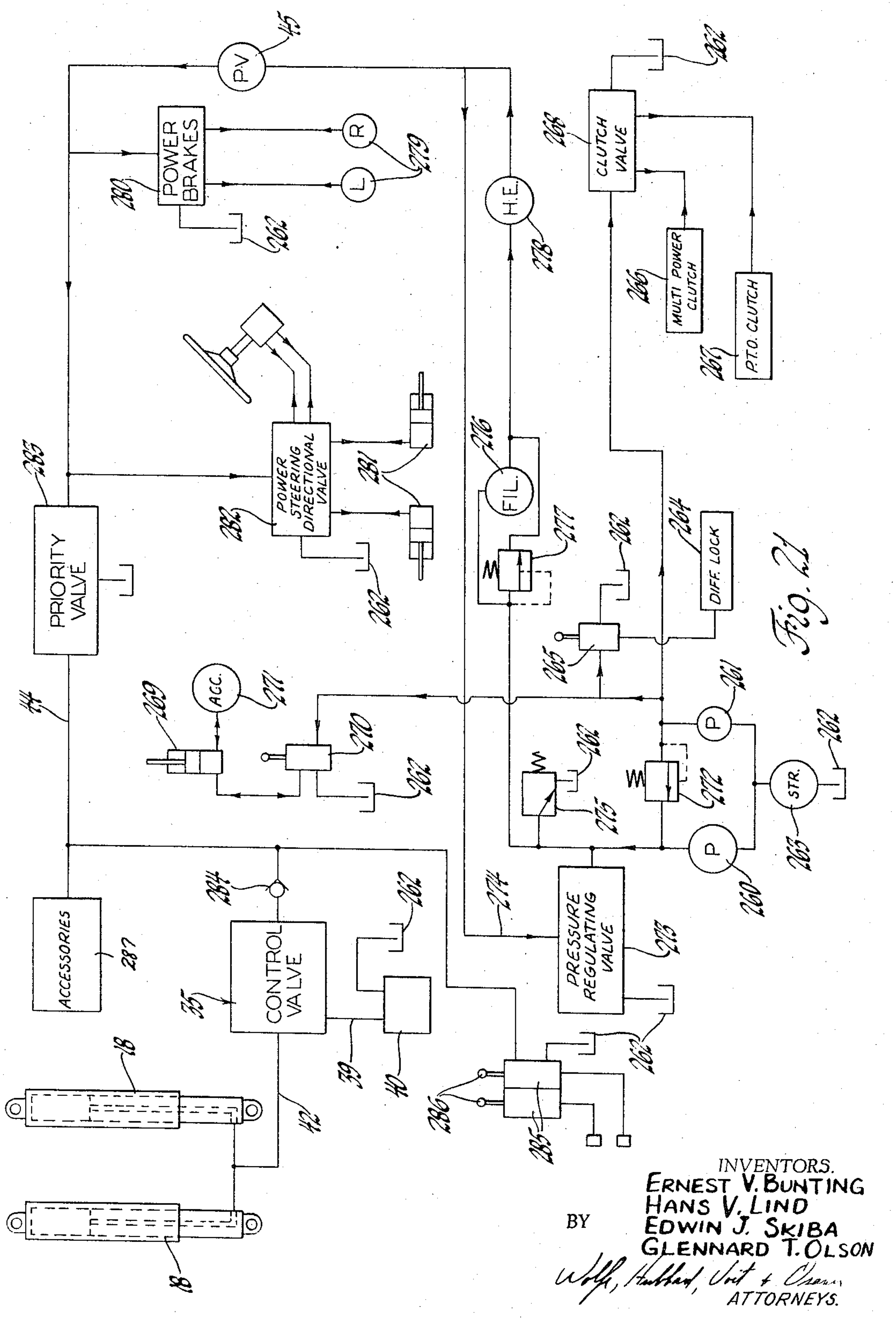

FIGS. 15 and 16 are enlarged fragmentary sections taken, respectively, approximately along the lines 15—15 and 16—16 in FIG. 8;

FIG. 17 is an enlarged fragmentary section taken approximately along the line 17—17 in FIG. 2;

FIG. 18 is a section taken approximately along the line 18—18 in FIG. 17;

FIG. 19 is a fragmentary section taken approximately along the line 19—19 in FIG. 17;

FIG. 20 is a fragmentary section taken approximately along the line 20—20 in FIG. 17; and FIG. 21 is a schematic of the hydraulic system embodied in the tractor of FIG. 1.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Turning first to FIG. 1, there is shown a tractor 10, having an operator's seat 11 and a control console 12, coupled to a draft implement, in this case, a moldboard plow 13. The plow 13 carries the usual forward A-frame 14 and is mounted on the tractor 10 through a lower pair of draft links 15 and an upper control link 16, the links being pivotally secured on the rear of the tractor which is defined by a housing 17.

The draft links 15, only one of which is shown in FIG. 1, are arranged to be hydraulically lifted by a pair of hydraulic actuators 18 anchored at their lower ends to the tractor housing 17 and pivotally secured at their upper ends to respective ones of a pair of lift arms 19. The lift arms 19 are mounted on a rock shaft 20 journalled in the tractor housing 17 and are connected by respective drop links 21 to the draft links 15. Supplying hydraulic fluid under pressure to the actuators 18 extends the actuators and swings the lift arms 19 upwardly so as to lift, through the drop links 21, the hitch linkage and the implement 13.

To provide a mechanical motion reflecting the draft load on the hitch linkage, the forward end of the control link 16 is secured to the tractor 10 through a pair of cantilever supported, leaf springs 23 (see also FIGS. 8 and 10). The forward end of the control link 16 is secured by a pin 24 to a clevis 25 that straddles a collar 26 on a bar 27 which is bolted across the lower ends of the springs 23. The upper ends of the springs 23 are secured by a strap plate 28 to the rear of a cover 30 that forms the upper end of the tractor housing 17. The springs 23 are tapered in width so as to provide strength where they are mounted on the tractor as well as sufficient elasticity to serve as a flexible mounting for the front end of the link 16. Compression forces in the link 16 flex the springs 23 counterclockwise as seen in FIG. 8, and tension forces in the link bend the lower ends of the springs 23 to the left in FIG. 8 or in a clockwise direction. Preferably, the bar 27 passes through a pair of apertured guard plates 31 which are bolted to the rear portion of the tractor housing 17 between the lower ends of the springs 23 and serve as stops limiting flexure of the springs under forces exerted through the top control link 16.

*Main control valve*

Figure 14:
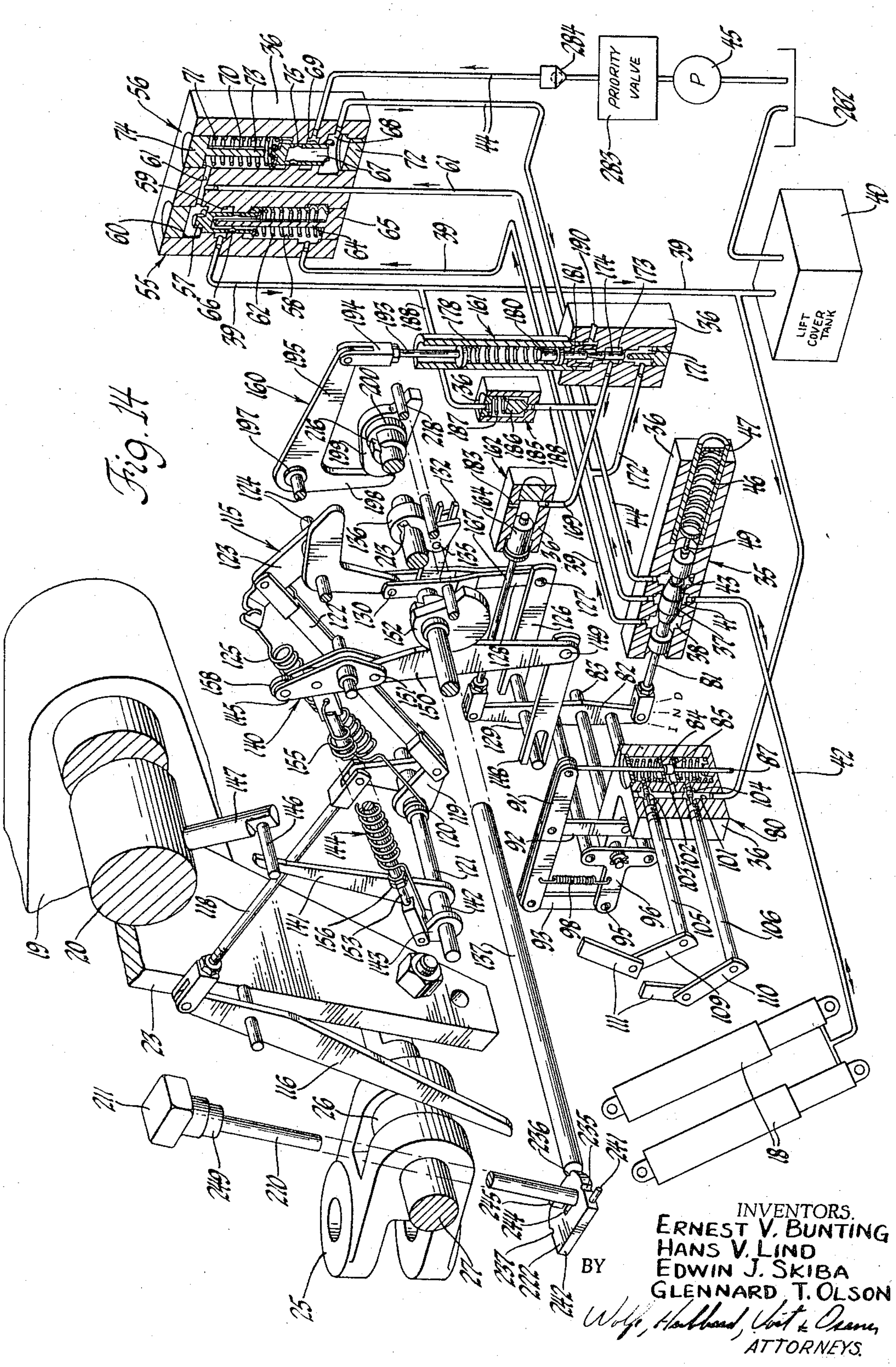
FIG. 14 is a partially diagrammatic perspective of the control system otherwise illustrated in the previous figures.

Fluid supplied to the actuators 18 is controlled by a main control valve 35 formed in a valve body 36 secured to the inner side of the right hand wall of the housing cover 30 (see FIGS. 2, 8 and 9). The valve 35 includes a plunger 37 slidable between a low-pressure chamber 38 connected by a passage 39 to a lift cover tank 40 (see also FIG. 14), an actuator pressure chamber 41 connected by a line 42 to the actuators 18 and a high-pressure chamber 43 connected by a passage 44 to a pump 45 serving as a source of fluid under pressure. Movement of the valve plunger 37 to the left or raising position as seen in FIGS. 9 and 14, opens the high-pressure chamber 43 to the actuator pressure chamber 41 so that fluid is directed from the pump 45 to the actuators 18, thus raising the hitch linkage. Movement of the valve plunger 37 to the right or lowering position opens the low-pressure chamber 38 to the actuator pressure chamber 41 so that fluid is discharged from the actuators 18 through the line 42 and the passage 39 to the lift cover tank 40, thus lowering the hitch linkage. In the center or holding position of the valve plunger 37, as illustrated in FIG. 9, the chamber 41 is blocked by the valve plunger and fluid is locked in the actuators 18 so as to hold the linkage in position.

The valve plunger 37 is biased toward its raising position by a spring 46 anchored in a sleeve 47 that is rotatably mounted in the valve body 36 and which is arranged to be angularly oscillated by a lever 48 in a manner well known to those skilled in this art. The spring 46 acts on the valve plunger 37 through a connector 49 with a head 50 having a non-rotatable fit in the end of the plunger 37. The connector 49 also carries a washer 51 against which the spring 46 bears and the washer has an irregular periphery so that the connector 49 oscillates with the sleeve 47 and transmits this oscillation to the valve plunger 37, thereby avoiding any tendency of the valve plunger to stick.

As a feature of the control system, a discharge flow valve 55 and an intake flow valve 56 are interposed, respectively, in the pasages 39 and 44 extending between the main valve 35, the lift cover tank 40 and the pump 45 (see FIGS. 14, 15 and 16). The valves 55, 56 are formed in the valve body 36 and are effective for maintaining the pressure drops across the main valve 35 substantially constant and independent of fluid flow rate of the loading on the actuators 18.

The discharge flow valve 55 includes an open center plug 57 slidable in lands between three adjacent chambers; a discharge chamber 58 open to the center of the plug 57, a sump chamber 59 connected by the passage 39 to the lift cover tank 40, and a pressure sensing chamber 60 which is connected by a passage 61 to the actuators 18 through the chamber 41 in the main valve 35 and the line 42. A compressed spring 62 urges the plug 57 up against the force exerted on the end of the plug by fluid in the pressure sensing chamber 60. An upper end cap 63 threaded into the valve body 36 limits upward movement of the plug 57, and a stem 64 secured to a lower cap 65 limits downward movement of the plug. The plug 57 is formed with a plurality of ports 66 which open the chamber 59 to the chamber 58 when the plug 57 is up against the cap 63, but which close off these two chambers when the plug is down in its illustrated position against the stem 64. Thus, when the force of the spring 62 and the pressure of the fluid in the discharge chamber 58 exceeds the pressure of fluid in the pressure chamber 60, which is the pressure in the actuators 18, the plug 57 shifts up and the valve 55 opens. The valve closes when the actuator pressure exceeds the force of the spring 62 and the pressure on the downstream side of the main control valve which is reflected as the pressure in the chamber 58.

Therefore, the valve 55 permits discharge fluid flow through the main control valve 35 only at or below a pressure drop represented by the force of the spring 62. If the pressure differential in the discharge direction across the main control valve 35 is greater than the force of the spring 62, the plug 57 shifts and blocks fluid flow until movement of the main valve plunger 37 toward its lowering position is effective to increase pressure in the chamber 58 by connecting that chamber with the actuators 18, whereupon the valve 55 opens and flow resumes at higher fluid presures but at the same regulated pressure drop across the main control valve.

The intake flow valve 56 also includes an open center plug 67 that is slidable in lands between three adjacent chambers; an intake chambers 68 open to the center of the plug 67 and connected by the pasage 44 to the high-pressure chamber 43 of the main control valve 35, a pump chamber 69 connected to the pump 45, and a pressure sensing chamber 70 connected by the line 61 to the actuators 18 through the main control valve chamber 41 and the line 42. A compressed spring 71 urges the plug 67 downwardly against the force exerted on the lower surfaces of the plug by fluid in the intake chamber 68. A lower cap 72 limits downward movement of the plug 67 and a stem 73 on an upper cap 74 limits upward movement of the plug. The plug 67 is formed with a plurality of ports 75 which open the chamber 69 to the chamber 68 when the plug 67 is shifted downwardly. With the plug 67 in its illustrated upper position, the chambers 68, 69 are blocked from one another. Thus, when the force of the spring 71 and the pressure of the fluid in the actuator pressure sensing chamber 70 exceeds the pressure of the fluid in the intake chamber 68, the plug 67 shifts downwardly and the valve 56 opens. The valve closes when the pressure in the intake chamber 68 exceeds both the force of the spring 71 and the pressure on the downstream side of the main control valve 35, reflected by the pressure in the chamber 70.

Therefore, the valve 56 permits actuator intake fluid flow through the main control valve 35 only at or below a pressure drop represented by the force of the spring 71. If the pressure differential is greater, the plug 67 shifts and blocks flow until movement of the main valve plunger 37 equalizes pressure in the chambers 68 and 70 so that flow resumes at higher pressures but at the same regulated pressure drop.

The valves 55, 56 are thus effective to give the control system a uniform control response even when heavy loads are mounted on the hitch linkage and large quantities of hydraulic fluid are utilized in the system.

*Valve dampening dashpot*

For insuring smoothness in operation of the main control valve 35, a dashpot device 80 (see FIGS. 14 and 17)

is provided to dampen shifting movement of the main valve plunger 37 in both directions. The valve plunger 37 is shifted against the force of the spring 46 by a valve control rod 81 whose outer end is pinned to the lower end of a control lever 82 that is pivoted on a pin 83 sleeved in a lug 83*a* formed integrally with the valve body 36. The device 80 includes a pair of pistons 84 and 85 slidably mounted in a cylinder 86 bored in the body 36 and connected by a form of parallelogram linkage to the control lever 82.

The pistons 84, 85 are slidable on a rod 87 and are urged by respective light springs 88 and 89 against a clip 90 locked in a recess in the cylinder 86 to define a center or neutral position for the pistons (see also FIG. 20). The upper end of the rod 87 is pivotally connected to a double lever 91 forming the upper link of the parallelogram linkage. The double lever embraces side links 92 and 93, with the link 92 being pivoted by a sleeve pin 94 on the lug 83*a* and the link 93 being pivoted by a pin 95 to a bifurcated, T-shaped, double lever 96. The lever 96 is also pivoted on the pin 83 alongside of the control lever 82 and is coupled by a pair of rivets 97 and intermediate spacers directly to the control lever so that the levers 82 and 96 swing in unison about the pin 83. A spring 98 is preferably extended between the levers 91 and 96 so as to take up whatever slight slack there may be in the parallelogram linkage.

It can thus be seen that swinging movement of the control lever 82 is translated, through the parallelogram linkage comprising the links 91–93 and 96, to linear movementt of the control rod 87. The control rod carries a collar 99 pinned to it between the pistons 84, 85. Upward movement of the control rod 87 thus pulls the piston 84, through the collar 99, upwardly, and downward movement of the rod pushes the piston 85, again through the collar 99, downwardly in the cylinder 86. The ends of the cylinder 86 are interconnected by a passage 101 formed in the valve body 36 and having a center passage 102 opening into the interior of the clip 90. The passage 101 and the cylinder 86 are filled with oil so that the piston 84 can be moved upwardly by the rod, and the piston 85 moved downwardly, only by circulating oil through the passage 101. Preferably, the valve body 36 is formed to define a charging orifice 101*a* opening into the passage 101 from the body of fluid in the system so that the passage 101 and the cylinder 86 remained filled with oil.

The pistons 84, 85 fit loosely about the rod 87 but the rod collar 99 seals against the piston 84 upon upward movement of the control rod 87 and against the piston 85 upon downward movement of the control rod. Once the control rod is displaced from its neutral position against the resistance of the oil acting against one of the pistons, the rod is free to return directly to its neutral position with the collar 99 pulling away from the displaced one of the pistons 84, 85. The displaced piston is restrained by the oil at atmospheric pressure on the collar side of the piston which exerts a greater force than the associated one of the light springs 88, 89 and the surrounding oil which, upon initial movement of the piston, is under slightly subatmospheric pressure. The displaced piston is returned against the clip 90 as additional oil leaks along the rod 87 and flows in from the passage 101 so as to eliminate the pressure differential.

The dampening effect of the device 80 is created, and regulated, by a pair of needle valves 103 and 104 positioned in the passage 101 on opposite sides of the center opening 102 (see also FIG. 2). The needles of the valve 103, 104 are carried on rods 105 and 106, respectively, threaded into the valve body 36. Biased gaskets 105*a* and 106*a* prevent fluid leakage around the rods. Rigidly secured to the rods 105, 106 are rod extensions journalled in a plate 107 mounted on an annular lateral extension 108 of the tractor housing cover 30. The rod extensions for the rods 105, 106 carry arms 109 and 110, respectively, which are connected by links 111 to thumbscrews 112 slidably mounted in slots 113 formed in a control cover 114 (see also FIGS. 4 and 6). By loosening respective ones of the thumbscrews 112 and sliding them in their slots 113, the arms 109, 110 can be selectively rotated so as to threadably advance or retract the rods 105, 106, and the respective ones of the needle valves 103, 104, in the valve body 36. The thumbscrews 112 thus adjust the openings provided by the needle valves and this, in turn, controls the dampening effect exerted by the device 80 on movement of the main valve plunger 37 in either direction from its neutral holding position.

The device 80, with the thumbscrews 112, enables the tractor operator to adjust out jerkiness or roughness in operation of the system since the main control valve cannot be shifted toward raising or lowering position at a rate greater than that permitted by the device 80. The proper setting of the thumbscrews 112 can be quickly determined by the operator and will vary with different types of implements, varying soil conditions, the particular load setting of the draft control system and variation in tractor pitching.

*Draft control linkage*

The control system includes a draft control linkage 115 (see FIGS. 8 and 14) responsive to draft loads on the hitch linkage and having a one-way connection with the main control valve 35 for movement of the plunger 37 in opposition to the bias of the spring 46. The linkage 115 includes a finger 116 pivoted between a pair of plates 117 secured on the rear of the tractor housing 17 so that the lower end of the finger 116 rides on the collar 26 of the control link bar 27. A link 118, adjustable in length, passes through the housing cover 30 and connects the finger 116 to a first bell crank 119 which includes a sleeve 120 rotatably carried on a shaft 121 mounted in the housing cover 30. A second link 122 connects the bell crank 119 to a second bell crank 123 that includes a sleeve journalled on a shaft 124 which is also mounted in the housing cover 30. A helical spring 125 is tensioned between the sleeve 120 and the bell crank 123 so as to bias the bell crank 123 counterclockwise and thus exert a resilient force holding the finger 116 against the bar collar 26.

As was pointed out above, the bar 27 moves as a result of the draft loading on the hitch linkage which is reflected by tension or compression in the control link 16 and the proportional deflection of the springs 23.

Movement of the bar 27, through the draft control linkage 115, thus results in rotation of the bell crank 123 and this provides a draft load feedback to the control system.

The one-way connection in the linkage 115 is provided by a slide 126 suspended by a pivot pin 127 on the lower end of a draft control lever 128. The slide 126 has a forked rear end embracing a pin 129 mounted on the main valve control lever 82. The draft control lever 128 is pivoted by a pin 130 to the bell crank 123, and is fulcrumed by a pin 131 to an arm 132. It can thus be seen that clockwise rotation of the draft control lever 128 about the fulcrum pin 131 is effective, through the slide 126, to rotate the main valve control lever 82 in a counterclockwise direction. The forked end of the slide 126 permits the control lever 82 to pull away from the slide and swing counterclockwise without movement of the draft control lever 128 and the slide 126.

The function of the draft control linkage 115 will be plain to those familiar with this art. For example, a lessened draft load on the tractor hitch linkage results in a reduction in the compressive force carried by the control link 16 so that the springs 23 relax proportionately clockwise, resulting in a clockwise follow-up movement of the finger 116. This rotates the bell crank 119 in a clockwise direction and, through the link 122, the bell crank 123 is rotated counterclockwise so as to pivot the draft control lever 128 in a clockwise direction about the pivot pin 131. This carries the slide 126 to the left as seen in FIG. 8 so as to swing the main valve control lever 82 counterclockwise and urge the main valve plunger 37 through the rod 81, toward its right hand or lowering position against the biasing force of the spring 46. Asa result, fluid is exhausted from the actuators 18 and the hitch linkage is lowered until a greater draft force is developed, whereupon compression in the top link 16 is increased, the bar 27 is shifted to the right, and the draft control linkage restored to its orignal position holding the main valve plunger 37 in its neutral locking position.

An increased draft load force on the hitch linkage, resulting in further counterclockwise deflection of the springs 23, shifts the parts of the draft control linkage in the opposite directions from those described just above so as to allow the main valve control spring 46 to move the valve plunger toward the left and its raising positon. This directs additional fluid to the actuators 18, raises the hitch linkage and causes a reduction in the draft loading which restores the draft control linkage 115 to its previous condition returning the main valve plunger 37 to its central holding position.

To permit selection of the desired draft load to be maintained by the draft control linkage 115, the linkage is selectively positioned with respect to the main control valve 35 so as to vary the draft load required to shift the plunger 37 to holding position against the force of the spring 46. For this purpose, the arm 132 is provided with a forked forward end fitted over a pin 135 mounted eccentrically on a draft control elements 136 rotatably carried on a control shaft 137 journalled in the end of the housing extension 108 (see also FIGS. 2 and 5). Clockwise movement of the element 136, as seen in FIG. 8, shifts the arm 132 to the left so as to swing the draft control lever 128 in a clockwise direction about the pivot pin 132. This swings, through the slide 126, the main valve control lever 82 counterclockwise and shifts the valve plunger 37 toward the right and its link lowering position. As a result, the hitch linkage is lowered and an increased draft is developed until the resulting change in deflection of the springs 23 turns the bell crank 123 clockwise about the shaft 124 so as to pivot the draft control lever 128 in a counterclockwise direction about the pin 131 and thereby permit the spring 46 to restore the main valve plunger 37 to its neutral holding positon. Counterclockwise movement of the element 136 allows the main control valve spring 46 to shift the valve plunger 37 toward the left and into its raising position so that the hitch linkage is elevated until the decreased draft loading rocks the bell crank 123 counterclockwise to restore the valve control lever 82, and thus the valve plunger 37, to their neutral positions.

Preferably, a stop screw 139 is adjustably threaded into the top of the housing over 30 so as to abut an arm 123*a* of the bell crank 123 and thus establish a limit position for the draft control linkage 115. Engagement between the arm 123*a* and the stop screw 139 stops the tension follow-up of the draft control linkage 115 and increased tension in the control link 16 simply causes the bar 27 to pull away from the finger 116. This interruption of the tension follow-up allows heavy implements to be transported on the tractor hitch linkage without affecting the main control valve 35. Even though a heavy implement bounces on the elevated hitch linkage, the varying tension in the top link 16, and the resulting deflection of the springs 23, does not send a feedback signal through the draft control linkage 115 since the bar 27 is then pulled away from the finger 116 and hence there is no undesirable cycling of the main control valve 35.

*Position control linkage*

The control system for the tractor 10 also includes a position control linkage 140 (see FIGS. 11 and 14) that is responsive to the position to which the hitch linkage is lifted and which has a one-way connection with the main control valve for movement of the valve plunger 37 in opposition to the force of the spring 46. The position control linkage 140 includes a finger 141 secured to a sleeve 142 that is journalled on the shaft 121 and which carries an arm 143. The arm 143 is connected by a link 144 to a double lever 145 that is mounted on a sleeve rotatably fitted on the shaft 124. The finger 141 rests against a pin 146 carried on an arm 147 that is fitted in the rock shaft 20. Thus, raising of the hitch linkage resulting from upward movement of the lift arms 19 causes the pin 146 to swing the finger 141 counterclockwise, with resulting counterclockwise movement of the lever 145. Lowering of the hitch linkage moves the parts in the opposite direction and the lever 145 is permitted to move in a clockwise direction.

The one-way connection in the position control linkage 140 is provided by a slide 148 suspended by a pivot pin 149 on the lower end of a position control lever 150 pivotally hung by a pin 151 on the lever 145. The slide 148 has a forked end embracing the pin 129 on the main valve control lever 82, and the slide 148 is positioned on the side of the control lever 82 that is opposite from the slide 126 of the draft control linkage 115 (see also FIG. 2). The position control lever 150 is fulcrumed against a position control cam 152, and the cam is rotatably mounted on the control shaft 137 so as to selectively position the linkage 140 with respect to the main control valve 35 and thus vary the link position require to shift the valve plunger 37 to holding position against the force of the spring 46.

Figure 11:
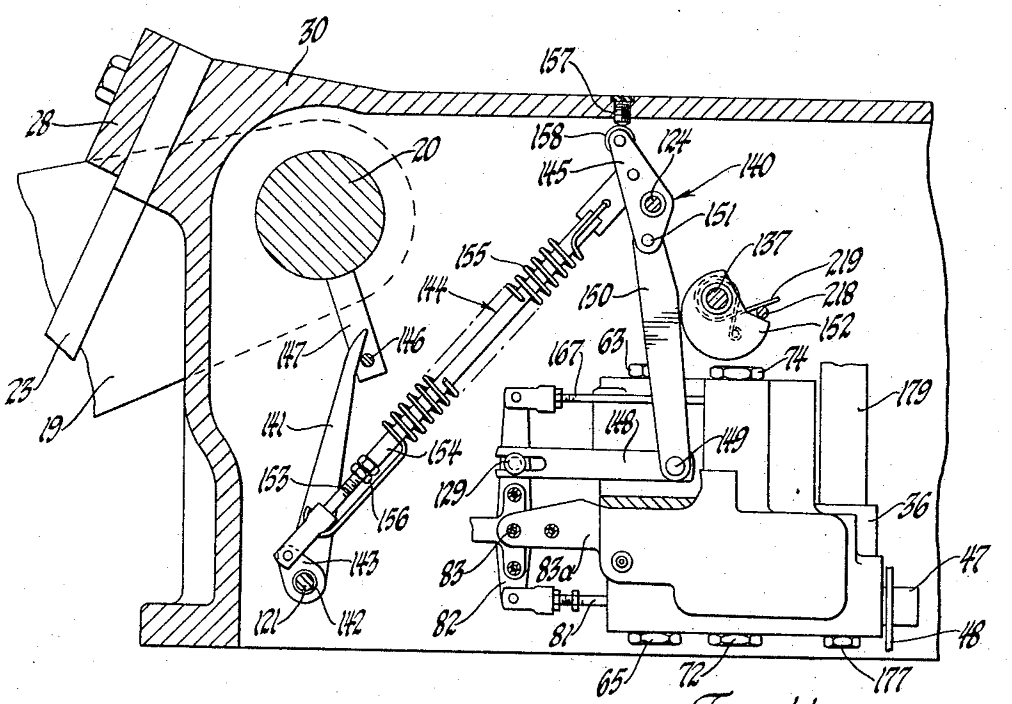
FIG. 11 is a section taken approximately along the line 11—11 in FIG. 2.

Clockwise movement of the cam 152 pivots the position control lever 150 about the pin 151 so as to push the slide 148 to the left as seen in FIG. 11. With the linkage 140 in operation, there is no lost motion between the slide 148 and the pin 129, as appears in FIG. 11, and this direction of movement rotates the valve control lever 82 counterclockwise and pushes the valve plunger 37 against the bias of the spring 46 into lowering position. Fluid is then exhausted from the actuators 18 so that the lift arms 19 swing downwardly until the resulting counterclockwise movement of the pin 146 allows the force of the main control valve spring 46 to rock the lever 82 clockwise, and the lever 150 counterclockwise, so as to restore the valve plunger 37 to its neutral holding position.

Counterclockwise rotation of the cam 152 results until reverse rotation of the parts of the position control linkage 140 until elevation of the lift arms 19 and counterclockwise swinging movement of the pin 146 restores the valve plunger 37 to its neutral holding position.

Preferably, the link 144 is a compression link arranged to resiliently expand under tension loads. For this purpose, the link is formed of a rod 153 slidably fitted in a sleeve 154 which is held by a tensioned spring 155 against a pair of nuts 156 jammed together on a threaded portion of the rod 153. The link 144 thus permits movements of the cam 152 which would be too rapid for compensating movement of the rock shaft 20 or the control valve rod 81. For example, sudden rocking of the cam 152 in a clockwise direction, before there can be corresponding movement of the rock shaft 20 as when the links 15 do not lower rapidly, simply rotates the position control lever 150 counterclockwise about the pin 149 so as to swing the lever 145 clockwise, expanding the link 144 by pulling the sleeve 154 from the nuts 156. The spring 155 restores the link to its selected length upon responsive movement of the control valve lever 82, subsequently, of the rock shaft 20. The adjustable jammed nuts 156 permit the length of the link 144 to be adjusted.

In the illustrated construction, an adjustable abutment screw 157 is provided for the end of the lever 145, and the latter carries a roller 158 for engagement with the abutment screw 157 without danger of wedging the lever 145 into an inoperative condition. The interengagement between the roller 158 and the screw 157 prevents the finger 141 from falling past the pin 146 upon extreme counterclockwise rotation of the arm 147.

It will be readily apparent that the one-way connections in the control linkages 115 and 140, provided by the respective slides 126 and 148, permit each control linkage to act independently from the other with the inactive one of the slides 126, 148 riding idly on the control lever pin 129.

*Pressure control linkage*

Figure 12:
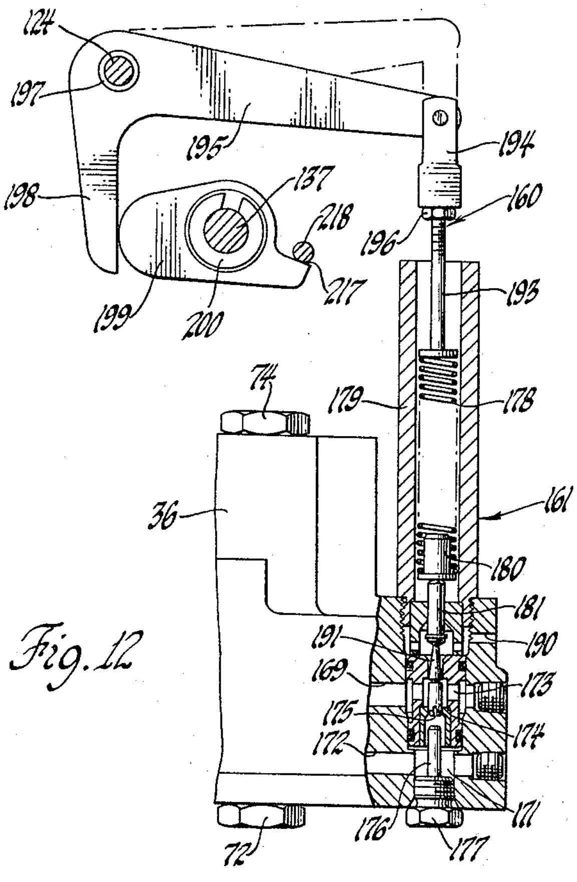
FIG. 12 is an enlarged fragmentary section taken approximately along the line 12—12 in FIG. 2.
Figure 13:
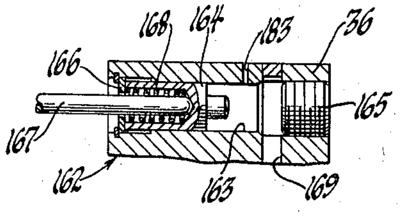
FIG. 13 is, like FIG. 9, a fragmentary section of a portion of the structure otherwise shown in FIG. 8.

The control system for the tractor 10 includes, in addition to draft and position control capability, a pressure control linkage 160 including a pressure control valve 161 responsive to the fluid pressure in the actuators 18 and effective to deliver fluid to a servo 162 when the set pressure is exceeded, the servo having a one-way connection with the main valve plunger 37 for shifting it in opposition to the bias of the spring 46 (see FIGS. 12, 13 and 14). The servo 162 includes a cylinder 163 formed in the valve block 36 in which is slidably carried a recessed piston 164 that reciprocates between the plug 165 and a snap-ring mounted washer 166. The one-way connection between the servo 162 and the main valve 35 is defined by a rod 167 that is pivotally secured to the top of the valve control lever 82 at one end and whose other end passes freely through the washer 166 to be received within the recessed piston 164. A spring 168 compressed between the piston 164 and the washer 166 urges the piston toward the right and into its non-activated position. Fluid under pressure passing through a passage 169 from the valve 161 shifts the piston 164 against the bias of the spring 168 into engagement with the washer 166 so that the piston pushes the rod 167 so as to swing the control lever 82 into neutral position, wherein the main valve plunger 37 is shifted from its raising to its neutral or holding position. In other words, activation of the servo 162 is effective to cut off fluid flow to the actuators 18 by closing the main valve 35. It will be readily apparent that the rod 167 can pull away from the piston 164 when the latter is in its right-hand, non-activated position so that the pressure control linkage 160 does not interfere with operation of the draft control linkage 115 or the position control linkage 140.

The pressure control valve 161 is also formed in the valve block 36 and it includes a stack of sleeves mounted in the valve body to define a pressure chamber 171, coupled by a passage 172 to the passage 61 which leads via the main control valve chamber 41 and the line 42 to the actuators 18, and a servo chamber 173 connected by the passage 169 to the servo 162. Communication between the chambers 171, 173 is normally blocked by a slidable, finely finished valve element 174 having a slotted end 175 which is urged against a stem 176 of a cap 177 by a spring 178. The spring 178 is positioned in a sleeve 179 threaded into a valve body 36, and the lower end of the spring is seated on a T-plug 180 that biases the valve element 174 through a spacer 181.

Pressure in the chamber 171 exerts a lifting force on the valve element 174 and, when the force of the spring 178 is exceeded, the element 174 lifts and its slotted end 175 allows fluid to pass from the chamber 171 into the chamber 173 so as to activate the servo 162.

Preferably, the servo cylinder 163 is opened by a small bleed hole 183 so that the pressure control valve 161 can act as a flow regulator valve and continue to pass oil at the set or opening pressure. This avoids forming the valve 161 with a dwell or neutral position and eliminates on-off chattering of the valve.

A relief valve 185 (see FIG. 14) is also formed in the valve block 36 for both protecting the servo 162 and for maintaining a constant pressure in the actuators 18 by bleeding off excess fluid. The valve 185 includes a blocking element 186 biased by a spring 187 toward a normal position closing a passage 188 which extends between the passage 169 and the discharge passage 39. The spring 187 is selected to allow the element 186 to shift at a pressure slightly higher tha nthat required to operate the servo 162. It will be readily seen that upon opening of the pressure control valve 161 and actuation of the servo 162, fluid in the actuators 18 at greater pressure than that for which the control valve 161 is set will be relieved through the then open relief valve 185 and discharged to the lift cover tank 40. The valve 185 thus protects the servo 162 and also releases fluid from the actuators 18 when a greater than maximum desirable pressure is reached, as determined by the pressure control valve 161.

It can also be noted that the pressure control linkage 161 constitutes a form of safety or shock relief mechanism for the control system. A sudden increase of force exerted on the actuators 18 resulting in a surge of additional pressure in the fluid system will open the valve 161, shift the main control valve to holding position so as to prevent additional fluid from the pump 45 being added to the system, and also open the relief valve 185 so as to reduce the pressure in the actuators.

To provide for rapid deactivation and recovery of the pressure control linkage 160, the pressure control valve 161 is formed with an exhaust passage 190 and the valve element 174 has a tapered end 191 which opens the exhaust passage 190 to the servo passage 169 when the valve element 174 moves under the force of the spring 178 toward the stop stem 176. Thus, as soon as the valve opening pressure in the chamber 171 is reduced, the spring 178 returns the valve element 174 towards the stem 176 so that the tapered end 191 of the valve element places the servo passage 169 in communication with the exhaust passage 190. The servo spring 168 can then easily exhaust fluid from the servo chamber 163 through the passage 190 and the servo quickly returns to its non-activated condition.

For setting the pressure at which the valve 161 opens to actuate the servo 162, the upper end of the valve spring 178 bears against a T-bolt 193 which is threaded into a clevis 194 pivoted on the end of a pressure control lever 195. A lock nut 196 on the bolt 193 sets the threaded adjustment between the bolt and the lever 195. The lever is carried on a sleeve 197 pivoted on the shaft 124 and is formed with a follower arm 198 engaging a pressure control cam 199. The cam 199 is rigidly secured to a sleeve 200 that is rotatably mounted at one end in a web 201 formed in the housing cover 30 and at the other end in a support plate 202 secured by a post 203 to the inner end of the housing extension 108 (see also FIGS. 2 and 5). The end of the control shaft 137 is piloted into the end of the sleeve 200.

It will be readily seen that the angular disposition of the cam 199 controls the angle at which the lever 195 is stopped under the upward force exerted by the valve spring 178. By swinging the lever 195 between the full and dashed line positions shown in FIG. 12, the force exerted by the valve spring 178 can be varied and this, of course, permits a selection of pressures at which the valve 161 opens to actuate the servo 162. The full line position of the parts shown in FIG. 12 illustrates the maximum pressure setting for the valve 161, and rotation of the cam 199 in a clockwise direction allows the lever 195 to approach its dashed line position so as to reduce the force exerted by the spring 178 and, hence, lower the pressure at which the pressure responsive valve 161 opens.

*Manual control lever*

Figure 5:
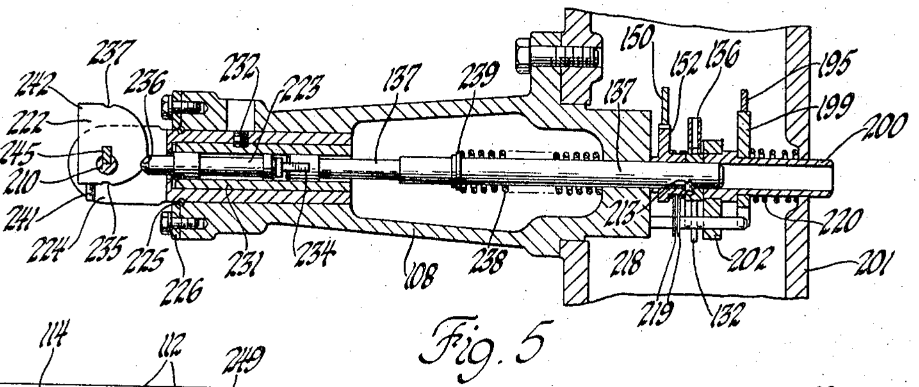
FIG. 5 is a section taken approximately along the line 5—5 in FIG. 2.

Pursuant to the invention, a single, manually operated control lever 210 is provided as part of the tractor control console 12 for controlling the linkages 115, 140 and 160 (see particularly FIGS. 2, 5 and 14). The lever 210 swings in the control cover 114 and has a square knob 211 on its upper end that moves along a quadrant portion 212 of the cover 114 in an operating mode which has become familiar to users of Ferguson system tractors over the years.

For achieving multiple control with the lever 210, a clutch arrangement is provided for selectively coupling the lever with the draft control element 136, the position control cam 152, and the pressure control cam 199. The clutch arrangement of the illustrated control system includes the control shaft 137 which is mounted to be axially slidable, as well as rotatable, and which carries a lug 213 adapted to be received in slots 214, 215 and 216 formed, respectively, in the cam 152, the element 136, and the sleeve 200 on which the cam 199 is mounted (see particularly FIG. 7). With the lug 213 in one of the slots 214–216, the control shaft 137 and the cam or element corresponding to the engaged slot are locked for simultaneous rotation.

The cams 152, 199 and the element 136 are formed with respective abutment surfaces 217 that engage a stop pin 218 fixed in the plate 202 and in the end of the housing extension 108 (see FIG. 5). With the abutment surfaces 217 engaging the stop pin 218, the slots 214–216 are alined and the position control cam 152 is in the maximum raise or transport position, the draft control element 136 is in the minimum or no draft load position, and the pressure control cam 199 is in the maximum pressure response position. Preferably, individual torsion springs 219 are secured to the position control cam 152 and the draft control element 136 so as to resiliently urge the abutment surfaces 217 on these parts against the stop pin 218 when the respective slots 214 and 215 are not engaged by the control shaft lug 213 (see also FIGS. 8 and 11). A compressed helical spring 220 is fitted about the sleeve 200 and sandwiched between the housing web 201 and the cam 199 so as to hold the sleeve 200 in place and create restraining friction between the sleeve 200 and the plate 202 which, together with the force exerted by the lever 195, is effective to hold the cam 199 in its maximum pressure position with its abutment surface 217 against the stop pin 218 during the times that the control shaft lug 213 is not fitted in the slot 216 (see also FIGS. 5 and 12).

To axially shift the control shaft 137, the control lever 210 is angularly adjustable about its longitudinal axis and carries a cam 222 that acts on the control shaft 137 through a slide 223. The control shaft 210 is mounted in a headed sleeve 224 journalled in the end of the housing extension 108 and held in position by a lock ring 225 secured by a plate 226 screwed onto the end of the extension 108. The headed sleeve 224 is slotted to receive the cam 222 (see FIGS. 2 and 5) and a transverse bore holds a press fitted annular keeper 227 that slidably and rotatably holds the control lever 210. The lever 210 is further guided by a circular follower 228 pinned to the lower end of the shaft 210 so as to ride in the transverse bore formed in the sleeve 224. A stop plate 229 is preferably screwed to the bottom of the sleeve 224 so as to engage the follower 228 and limit downward movement of the control lever 210.

The slide 223 is fitted in a guide sleeve 231, secured by set screws 232 to the headed sleeve 224, which is formed with a slotted end 233 that slidably receives a key portion 234 formed on the end of the side 223. The adjacent end of the control shaft 137 is bifurcated and fitted over the key portion 234 so that the slide 223 and the control shaft 137 are locked together for mutual rotation.

It can thus been that swinging movement of the control lever knob 211 along the quadrant portion 212 rotates the headed sleeve 224 and, because of the interlocked slotted sleeve 231 and the key portion 234 of the slide 223, the control shaft 137 rotates in unison with the control lever 210.

The cam 222 is formed with three detent notches 235, 236 and 237 spaced at varying distances from the axis of the shaft 210 and positioned approximately ninety degrees from one another. One end of the slide 223 rides on the periphery of the cam 222 and is adapted to detent into a selected one of the notches 235–237. In the illustrated construction, a compressed helical spring 238 surrounds the control shaft 137 and is sandwiched between the end of the annular housing extension 108 and a collar 239 on the control shaft so that the shaft is urged to the left in the drawings and, hence, the slide 223 is held resiliently against the periphery of the cam 222.

With the slide 223 seated in the notch 236 of the cam 222, the control shaft 137 is positioned axially so that its lug 213 is seated in the slot 215 of the draft control element 136 and, hence, there is a mechanical connection between the control lever 210 and the draft control linkage 115. Counterclockwise movement of the cam 222 ninety degrees as seen in FIG. 5 allows the spring 238 to shift the control shaft 137 and the slide 223 to the left until the slide seats in the detent notch 235, in which position the control shaft lug 213 is received in the slot 214 and the manual control lever 210 is mechanically coupled to the position control cam 152 and, hence, to the position control linkage 140. Ninety degrees clockwise rotation of the cam 222, again as seen in FIG. 5, brings the slide 223 into the notch 237 and this shifts the control shaft 137 to the right in this figure so that the control shaft lug 213 is seated in the slot 216, with the result that the manual control lever 210 is mechanically coupled to the cam 199 and the pressure control linkage 160.

In the illustrated construction, a pin 241 projecting from the periphery of the cam 222 limits counterclockwise rotation of the cam by abutting the side of the slide 223, and a right angled projection 242 on the cam periphery limits clockwise rotation of the cam by abutting the end of the slot formed in the head of the sleeve 224.

Figure 4:
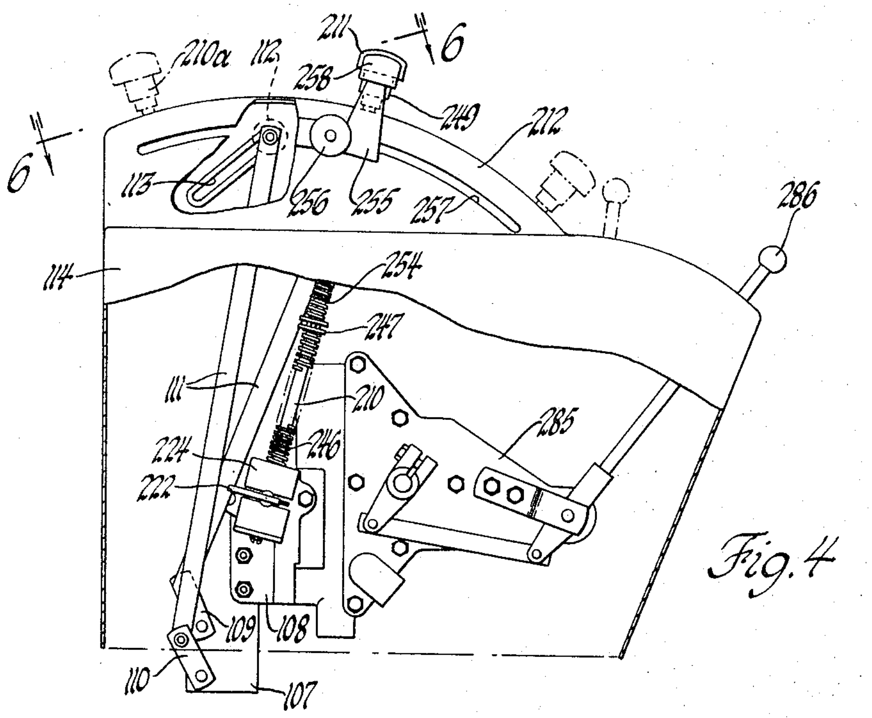
FIG. 4 is a slightly reduced elevation, with portions broken away, taken approximately along the line 4—4 in FIG. 2.

The clutch arrangement associated with the control shaft 210 prevents rotation of the cam 222 unless the shaft 210 is swung to a full-up or function changing position, as shown in dashed lines 210*a* in FIG. 4, wherein the control shaft lug 213 is angularly aligned with all of the slots 214–216 when their respective cams and element engage the stop pin 218. As a result, the operator of the tractor 10 cannot change between draft, position and pressure control unless the draft linkage 115 is in its minimum or no load position, the position control linkage 140 is set in its transport position, and the pressure control linkage 160 is set at its maximum setting. To accomplish this objective, the cam 222 is freely rotatable on the shaft 210 and is formed with a keyslot 244 proportioned to receive a key 245 fixed on the shaft 210 (see also FIG. 14). The shaft 210 is urged upwardly by a spring 246 surrounding the lower portion of the control shaft and sandwiched between the upper end of the keeper 227 and a collar 247 pinned to the midportion of the shaft. Thus, the key 245 is normally raised out of the keyslot 244 and is received in one of three peripherally spaced slots 248 formed in the lower end of the keeper 227.

Figures 6, 7:
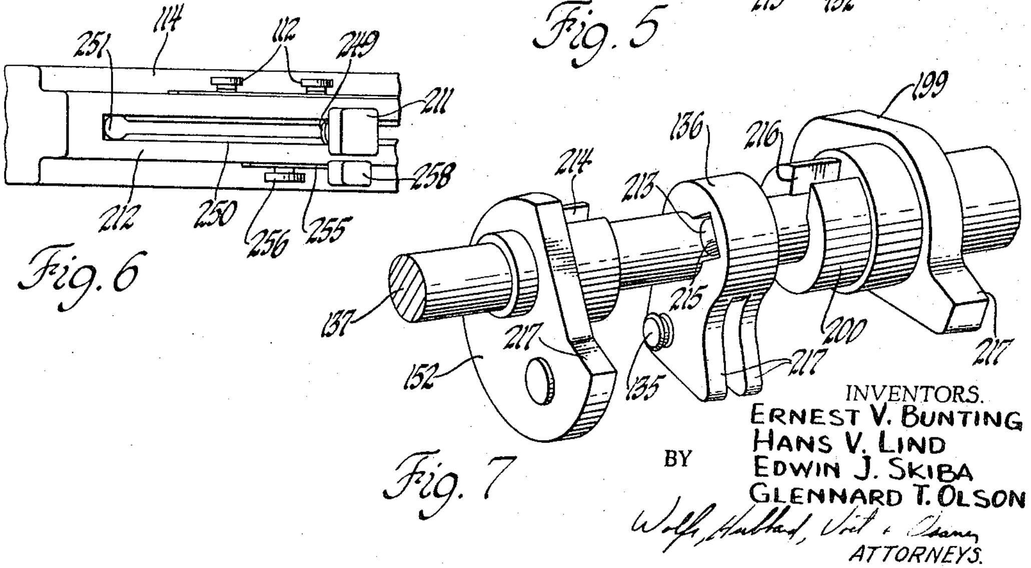
FIG. 6 is a fragmentary plan taken along the line 6—6 in FIG. 4.
FIG. 7 is an enlarged fragmentary perspective of a portion of the structure otherwise appearing in FIGS. 2 and 5 and with the parts being shown somewhat distorted for clarity.

Downward axial movement of the control shaft 210 is restricted by interference between a circular collar 249 formed at the upper end of the control shaft and an arcuate slotted plate 250 mounted at the top of the quadrant portion 212 of the cover 114 and through which the control shaft 210 projects (see also FIG. 6). The plate 250 is formed with a circular opening 251 which corresponds angularly to the function changing position 210*a* of the control shaft 210 and which is proportioned to receive the shaft collar 249 so as to permit downward axial movement of the control shaft only when the latter is in its neutral position.

The operation of the control shaft and its associated clutch arrangement can now be seen. In the illustrated condition, the control shaft 210 is coupled to the draft control element 136 since the slide 223 is seated in the notch 236 of the cam 222, with the result that the control shaft lug 213 is fitted in the slot 215 of the element 136. Hence, swinging movement of the control shaft 210 along the quadrant portion 212 results in positioning of the draft control linkage 115 in the manner described above. Engagement of the slide 223 in the detent notch 236 holds the cam 222 in position. The shaft 210 cannot be inadvertently rotated since the key 245 is fitted into one of the keeper slots 248, and the shaft collar 249 overlies the slotted plate 250 and prevents sufficient downward axial movement of the control shaft to disturb the positioning of the cam 222.

When the operator desires to bring a different control linkage into operation, the lever 210 is swung to its function changing position 210a, returning the draft control element 136 to its rest position against the stop pin 218 and thus setting the draft control linkage 115 for minimum or no load draft response. With the lever 210 in its neutral position, the operator pushes the lever inwardly with respect to the cover 114 and the shaft collar 249 is received within the circular opening 251 formed in the slotted plate 250. This brings the key 245 into the keyslot 244 formed in the cam 222 so that the operator, by rotating the square knob 211, can swing the cam 222 either clockwise, so as to couple the shaft 210 to the pressure control linkage 160 in the manner described above, or counterclockwise as seen in the drawings with the result that the control shaft 210 becomes clutched to the position control linkage 140. Suitable lettering or indicia may be provided on the knob 211 to guide the operator in conditioning the system for the desired mode of operation.

After the desired angular adjustment of the control shaft 210, release of manual pressure on the knob 211 allows the spring 246 to return the shaft 210 upwardly, bringing the collar 249 above the slotted plate 250 and returning the key 245 from the keyslot 244 to one of the keeper slots 248. The control system is then conditioned for operation under the control of the selected linkage.

For resiliently holding the shaft 210 in a selected angular position along the quadrant portion 212, the illustrated construction includes a brake element 253 which is slidably fitted about the upper end of the control shaft 210 and urged by a compressed spring 254 upwardly against the underside of the slotted plate 250. The spring 254 surrounds the upper end of the control shaft and is seated on the collar 247. The frictional engagement between the brake element 253 and the slotted plate 250 provides a yieldable holding force that retains the shaft 210 in a selected angular position about the axis of the control shaft 137.

For the convenience of the tractor operator, it is also desirable to provide a settable stop 255 having a thumbscrew 256 permitting setting of the stop along an arcuate slot 257 formed in the side of the quadrant portion 212 of the cover 114. Preferably, the stop 255 is formed with a head 258 having a length approximating the side dimension of the control shaft knob 211 so that a tractor operator, simply by sensing the relative positions of the knob 211 and the head 258 with his fingertips, can quite accurately adjust the angular position of the control shaft 210 to a predetermined setting represented by the position of the stop 255.

*Central hydraulic system*

The control system described above, since it operates on the pressure side of a source of hydraulic fluid pressure, is well suited for incorporation in a centralized or unified hydraulic system in which one system meets all of the fluid power requirements of the tractor with the usual exception of the engine oil pump. Such a system is embodied in the tractor 10 and is diagrammed in FIG. 21.

The main fluid pressure source for the tractor 10 includes a main charging pump 260 operating in parallel with an auxiliary pump 261 and receiving fluid from the sump 262 through a strainer 263. The primary function of the auxiliary pump 261 is to supply oil under relatively medium pressure, for example 200 p.s.i., to a differential lock actuator 264 controlled by a valve 265, a transmission clutch 266 and a p.t.o. clutch 267 both operated by a clutch valve 268, and a power seat actuator 269 controlled by a valve 270 and associated with an accumulator 271. When fluid is not being drawn from the pump 261 by one of these auxiliaries, the output of the pump 261 is added, through a pressure reducing valve 272, to the output of the charging pump 260.

The output of the pump 260 is directed through a pressure regulating valve 273 operated from a pressure feedback line 274 extending from the downstream side of a maximum pressure relief valve 275, a filter 276 and its associated by pass 277, and a cooler or heat exchanger 278. The pressure regulating valve 273 is intended to maintain a relatively low, approximately constant input pressure, for example 90 p.s.i., to the pump 45 which, preferably is of the constant pressure type that delivers a varying volume output of high pressure oil, for example 2000 p.s.i., depending upon fluid utilization so that there is no pumping action unless fluid is being drawn from the output side of the pump. The output of the pump 45 supplies fluid to a power brake system including actuators 279 and a brake valve 280, a power steering mechanism including actuators 281 and a steering wheel control valve 282, and the hitch linkage actuators 18 through the control valve 35.

Preferably, one or more auxiliary valves 285 are adapted to be coupled in parallel with the main control valve 35. FIG. 21 diagrams a bank of two such valves 285 having control handles 286, and one such valve together with its control handle 286 is shown in FIGS. 1 and 4. Other accessories 287 may be operated from the high pressure line 44.

Preferably, a priority valve 283 is interposed between the pump 45 and both the auxiliary valves 285 and the link actuators 18. The function of the priority valve is to respond to a below-minimum pressure output of the pump 45 by blocking off fluid flow to the control valve 35 and auxiliary valves and directing all of the available fluid pressure to the power steering system and brake system. A check valve 284 is also interposed between the priority valve 283 and the main control valve 35 for the hitch linkage actuators 18 so as to isolate the hitch linkage system from a loss of fluid pressure in the remaining portions of the system.

We claim as our invention:

1. In a tractor having draft links hydraulically lifted by an actuator and a source of hydraulic pressure fluid, a control system comprising, a control valve for said fluid pressure source and said actuator, said valve having a shiftable element with adjacent alternate positions for hydraulically raising, holding and lowering said links, a draft control linkage for said valve element responsive to draft loads on said links, a position control linkage for said valve element responsive to the position to which said links are lifted, a pressure control linkage for said valve element responsive to the hydraulic pressure in said actuator, a manual control lever, and means including said lever for selectively clutching said lever to said linkages by manipulating said lever.

2. In a tractor having draft links hydraulically lifted by an actuator and a source of hydraulic pressure fluid, a control system comprising a control valve for said fluid pressure source and said actuator, said valve having a shiftable element with adjacent alternate positions for hydraulically raising, holding and lowering said links, a draft control linkage for said valve element responsive to draft loads on said links, a position control linkage for said valve element responsive to the position to which said links are lifted, a pressure control linkage for said valve element responsive to the hydraulic pressure in said actuator, a manual control lever, a clutch for selectively coupling said lever to said linkages, said control lever being angularly adjustable about its longitudinal axis, and means responsive to the angular adjustment of the lever for operating said clutch.

3. In a tractor having draft links hydraulically lifted by an actuator and a source of hydraulic pressure fluid, a control system comprising, a control valve for said fluid pressure source and said actuator, said valve having a shiftable element with adjacent alternate positions for hydraulically raising, holding and lowering said links, means for maintaining the pressure drop across said control valve constant when said element is in said raising and lowering positions, said valve being biased in one direction, a control linkage for transmitting a feedback response and having a one-way connection with said valve element for movement of the latter in opposition to said bias, means coupled to said linkage for selectively positioning said linkage with respect to said element so as to vary the amount of feedback required to shift the valve element to holding position against said bias, a manual control lever, and a clutch for selectively coupling said control lever to said means whereby the lever can adjust said linkage as well as perform alternate functions.

4. In a tractor having draft links hydraulically lifted by an actuator and a source of hydraulic pressure fluid, a control system comprising, a control valve for said fluid pressure source and said actuator, said valve having a shiftable element with adjacent alternate positions for hydraulically raising, holding and lowering said links, said valve being biased in one direction, means for maintaining the pressure drop across said control valve constant when in said raising and lowering positions, a first control linkage for transmitting a feedback response and having a one-way connection with said valve element for movement of the latter in opposition to said bias, means coupled to said first linkage for selectively positioning said linkage with respect to said element so as to vary the amount of feedback required to shift the valve element to holding position against said bias, a second control linkage for transmitting a feedback response and having a one-way connection with said valve element for movement of the latter in opposition to said bias, means coupled to said second linkage for selectively positioning said linkage with respect to said element so as to vary the amount of feedback required to shift the valve element to holding position against said bias, a manual control lever for adjusting said first and second linkages, a fluid dashpot coupled to said valve for dampening movement of the latter from holding position toward both raising and lowering positions, and a pair of adjustable controls for independently varying the dampening effect upon movements in said two directions.

5. In a tractor having draft links hydraulically lifted by an actuator and a source of hydraulic pressure fluid, a control system comprising, a control valve for said fluid pressure source and said actuator, said valve having a shiftable element with adjacent alternate positions for hydraulically raising, holding and lowering said links, said valve element being biased toward said raising position, a pressure control linkage including a servo and a settable pressure responsive valve open to said actuator and effective to deliver fluid to the servo when the set pressure is exceeded, said servo being connected to said valve element for movement of the latter in opposition to said bias when the servo is pressurized, said servo having a bleed passage so as to permit said pressure responsive valve to remain open at the set pressure, and said pressure responsive valve having an exhaust port which is brought into communication with said servo upon closing of the pressure responsive valve, a manual control lever, and a clutch for selectively coupling said control lever to settable valve.

6. In a tractor having draft links hydraulically lifted by an actuator and a source of hydraulic pressure fluid, a control system comprising, a control valve for said fluid pressure source and said actuator, said valve having a shiftable element with adjacent alternate positions for hydraulically raising, holding and lowering said links, said valve element being biased toward said raising position, means for maintaining the pressure drop across said control valve constant when said element is in said raising and lowering positions, a pressure control linkage including a servo and a settable pressure responsive valve open to said actuator and effective to deliver fluid to the servo when the set pressure is exceeded, said servo being connected to said valve element for movement of the latter in opposition to said bias when the servo is pressurized, said servo having a bleed passage so as to permit said pressure responsive valve to remain open at the set pressure, and said pressure responsive valve having an exhaust port which is brought into communication with said servo upon closing of the pressure responsive valve, a draft control linkage responsive to draft loads on said links and having a one-way connection with said valve element for movement of the latter in opposition to said bias, first means coupled to said draft control linkage for selectively positioning said linkage with respect to said element so as to vary the draft load required to shift the valve element to holding position against said bias, a position control linkage responsive to the position to which said links are lifted and having a one-way connection with said valve element for movement of the latter in opposition to said bias, second means coupled to said position control linkage for selectively positioning said linkage with respect to said element so as to vary the link position required to shift the valve element to holding position against said bias, a fluid dashpot coupled to said valve element for dampening movement of the latter from holding position toward both raising and lowering positions, and a pair of adjustable controls for independently varying the dampening effect upon movement in said two directions.

7. In a tractor having draft links hydraulically lifted by an actuator and a source of hydraulic pressure fluid, a control system comprising, a control valve for said fluid pressure source and said actuator, said valve having a shiftable element with adjacent alternate positions for hydraulically raising, holding and lowering said links, a dashpot rod coupled to said valve element, means defining an oil filled cylinder surrounding said rod, a pair of pistons fitted in said cylinder, said rod having a one-way connection with one of said pistons upon movement of said element toward raising position and a one-way connection with the other of said pistons upon movement of said element toward lowering position, and a pair of adjustable needle valves opening respectively into opposite ends of said cylinder so as to permit independent selection of the dampening effect exerted on the valve element upon movement of the latter in opposite directions from said holding position.

8. In a tractor control system, the combination comprising, a control shaft mounted for rotation and axial sliding movement, a draft control cam journalled on said shaft, a position control cam journalled on said shaft, a pressure control cam journalled on said shaft, said cams being positioned in adjacent relation and restrained from axial movement, a control lever disposed transversely of said shaft and coupled thereto so that swinging movement of the control lever rotates said shaft, said control lever being angularly adjustable about its longitudinal axis, a cam coupled to said lever for shifting said shaft axially upon angular adjustment of said lever, and a key on said shaft, said cams being slotted to receive said key so that a selected one of the cams can be rotatably keyed to said shaft by angularly adjusting said lever.

9. The combination of claim 8 including means preventing rotation of said cam by said control lever unless the lever is swung and said control shaft rotated to one function changing angular position.

10. In a tractor having draft links hydraulically lifted by an actuator and a source of hydraulic pressure fluid, a control system comprising a control valve for said fluid pressure source and said actuator, said valve having a shiftable element with adjacent alternate positions for hydraulically raising, holding and lowering said links, a draft control linkage for said valve element responsive to draft loads on said links, a position control linkage for said valve element responsive to the position to which said links are lifted, a pressure control linkage for said valve element responsive to the hydraulic pressure in said actuator, a manual control lever mounted for swinging movement, a clutch for selectively coupling said lever to said linkages, said control lever being angularly adjustable along its longitudinal axis, means responsive to the angular adjustment of the lever for operating said clutch, and means preventing said angular adjustment of said lever unless the lever is swung to a predetermined function changing position.

References Cited by the Examiner

UNITED STATES PATENTS

| | | | |
|---|---|---|---|
| 772,115 | 10/1904 | Thompson | 251—54 |
| 1,560,439 | 11/1925 | Trenor | 251—54 |
| 2,733,689 | 2/1956 | Badenock | 91—446 X |
| 2,822,737 | 2/1958 | Bunting | 172—9 |
| 2,971,585 | 2/1961 | Whittle et al. | 91—446 X |
| 2,994,346 | 8/1961 | Ruhl | 91—446 X |
| 2,996,125 | 8/1961 | Bunting | 172—9 |

FOREIGN PATENTS

| | | |
|---|---|---|
| 923,334 | 4/1963 | Great Britain. |

ABRAHAM G. STONE, *Primary Examiner.*

R. L. HOLLISTER, *Assistant Examiner.*